United States Patent
Alonso Cuesta

[11] Patent Number: 5,857,735
[45] Date of Patent: Jan. 12, 1999

[54] SELF-SUPPORTING ROOF WITH BUILT-IN FITTINGS DIRECTLY MOUNTABLE UPON VEHICLE ROOFS

[75] Inventor: Jeronimo Alonso Cuesta, Burgos, Spain

[73] Assignee: Irausa Ingenieria, S.A., Burgos, Spain

[21] Appl. No.: 820,235

[22] Filed: Mar. 18, 1997

Related U.S. Application Data

[63] Continuation-in-part of Ser. No. 402,908, Mar. 13, 1995, abandoned.

[30] Foreign Application Priority Data

Jun. 20, 1994 [ES] Spain ..................................... 9401338

[51] Int. Cl.[6] ................................................... B60R 13/02
[52] U.S. Cl. .............................................................. 296/214
[58] Field of Search ..................................... 296/214, 216, 296/210, 218, 224

[56] References Cited

U.S. PATENT DOCUMENTS

| | | | |
|---|---|---|---|
| 4,390,203 | 6/1983 | Lutz et al. | 296/223 |
| 4,981,323 | 1/1991 | Dowd et al. | 296/214 |
| 5,011,218 | 4/1991 | Danner et al. | 296/214 |
| 5,082,323 | 1/1992 | Dowd et al. | 296/214 |
| 5,120,593 | 6/1992 | Kurihara | 428/174 |
| 5,186,517 | 2/1993 | Gilmore et al. | 296/214 |
| 5,403,064 | 4/1995 | Mahler et al. | 296/214 |
| 5,484,186 | 1/1996 | Van Order et al. | 296/97.5 |

*Primary Examiner*—Gary C. Hoge
*Attorney, Agent, or Firm*—Helfgott & Karas, P.C.

[57] ABSTRACT

A self-supporting roof has preassembled the fittings preassembled on a self-supporting roof liner, clips provided on its inner face for anchoring the preassembled self-supporting roof liner to the bodywork of the vehicle. The clips are coupled directly by being embedded in holes provided in the vehicle bodywork.

10 Claims, 6 Drawing Sheets

SELF-SUPPORTING ROOF WITH BUILT-IN FITTINGS DIRECTLY MOUNTABLE UPON VEHICLE ROOFS

This is continuation-in-part, of application Ser. No. 08/402,908, filed Mar. 13, 1995 abandoned.

OBJECT OF THE INVENTION

The present invention relates to a self-supporting roof lining for vehicles or the like, having all the internal fittings that are usually assembled on the roofs, being altogether directly mountable onto the vehicle roof using clips, thereby substantially reducing the time of assembly or installation of the roofs, and improving the working conditions of the fitters.

BACKGROUND OF THE INVENTION

Vehicle roofs are usually internally lined with a roof liner that generally comprises a number of sheets or layers of various materials glued together, and hence are self-supporting and adapt well to the inner shape of the vehicle roof. Nowadays, the internal fittings as such sun visors, handles or hangers, are used to fix the roof liner to the vehicle roof. These fittings, present in every vehicle, have respective fixing elements that are basically bolts crossing through the roof liner and in turn fixing the same firmly against the vehicle roof. That is to say, the packing is always arranged between the fittings and the bodywork, and therefore attachment of the fittings, using nuts and bolts provided to such end, will cause the roof liner to be held tight between the two.

In this widely used system, the roof liner and the fittings aforesaid are fixed by hand inside the vehicle, placing the self-supporting roof lining between the fittings and the bodywork and then fixing the set fittings using bolts, which operation is both slow and inconvenient for workmen given the little space there is inside vehicles, which means that fitting the same fully requires between six and eight minutes.

In addition to this, workmen are frequently injured due to the awkward positions they have to work in within the vehicle to fit the roofs.

This is why motor car manufacturers would welcome a roof carrying all requisite fittings and having means for direct attachment in lieu of the usual lockscrews, in order for fitting, removal and replacement of components to be easier. The relevant roof must also be lightweight, conserve its self-supporting character and capacity to withstand loads, moreover allowing the same to be handled and mounted by only two workers.

The self-supporting roof subject of the invention fully eliminates the disadvantages described for current systems, moreover satisfying the necessary requirements, inasmuch as eliminating the need for the fittings to be mounted inside the vehicle, thereby reducing operations and working time inside the vehicle.

SUMMARY OF THE INVENTION

The roof subject hereof has been devised to solve the problems aforesaid, simplifying mounting operations and optimising the time taken by such operations. To this end, the self-supporting roof liner is designed to reach the vehicle in which it is to be mounted with preassembled fittings, a clip being used in preassembling the fittings that on one side receives the screws locking the fittings on the self-supporting roof liner, and on the other stands as a clip-in means to fix the roof liner to the bodywork where clip-receiving rectangular holes will naturally be provided.

The self-supporting roof liner is thus mounted directly on the bodywork, the bracing clips being insertable through the mouth of the relevant holes and pressed until clipped in. The clip has been designed to be easily arranged and inserted and for its tensile strength to be greater when clipped in than as generally required by vehicle manufacturers.

The number of clips to be used will be the same as the number of attachment points the fittings require in view of their characteristics, size or required tensile strength. Where no fittings are provided, the attachment points of the self-supporting roof liner use plastic clips of known kind.

Furthermore, since the fittings are preassembled outside the production line or even outside the assembly plant, the number of parts held in stock and assembled at the very plant is substantially reduced. This is why operation tests can be carried out prior to assembly and indeed the preassembled systems can be sent to the production plant according to the vehicle production sequences.

The attachment clips are made from steel strip and comprise a flat base having two slightly arched extensions and a pair of projections folded symmetrically inwards to form a sort of wedge, the side faces of the wedge having collapsible wings projecting outwards from the top edge and leading to a rounded free edge, the projections being meant for insertion, assisted by their wedge shape, through the mouth of receiving holes that are provided on the roof of the bodywork, wherein they are held by the wings that prevent their dislocation (clip effect).

The wedge-like folded extensions have their top ends folded with the heads facing each other. The clips moreover have a central hole receiving the bolts for assembling the fittings, either with the assistance of separating parts or directly.

It must be noted that the clip has two extensions at its base that usefully provide a good supporting surface for a better coupling to the fittings. The extensions are finally provided with holes that, together with studs provided on the separating parts or the fittings as such, help guide and position the clips at the preassembly stage of the fittings on the self-supporting roof liner, and prevent the fittings from turning once the roof liner is mounted on the bodywork of the vehicle.

The clip extensions can finally be slightly arched in order to obtain a compression spring effect, once they have been inserted in the housings and tightly clipped in. The spring effect offsets any gap left by a faulty tightening of the screws locking the fittings.

Accordingly, when fitting the subject roof it is sufficient for the metal clips mentioned above to be simply pressed into holes provided to such end on the roof of the bodywork, which operation is fostered by the wedge-shape of the clips. While the metal clip is passing through the mouth of the holes, its wings are pushed by the very edge of the hole and collapse, subsequently being released upon surpassing the same to retrieve their usual position and lie with their end supported by the edge of the hole.

Attachment using bolts, that is difficult and slow to provide inside the vehicle, is therefore replaced by fastening with clips, that are coupled simply by pressing them against the roof of the vehicle.

An alternative configuration of the clips of the present invention is that the ends of the extensions leading from the clip base extend laterally into portions defining four corners that allow the clip to be full stably supported, even if the window in which it is fitted is longer than required. These extensions are provided on slightly inclined plane, i.e., at an angle to the horizontal, to foster locking and fixing of the clip on the respective window.

Another characteristic of these clips lies in that the two holes provided at the end extensions of the base are no longer circular as in the main patent of the invention, but have a right-angled sector at the portion lying closest to the extreme edge, and said holes are therefore almost semicircular, resulting in a better insertion of the positioning guides of the bases of the fittings to be fixed, and moreover making it easier for the clip to be inserted in and then centered on the window, for the clip slides along the vertical, inclined planes that the bases supporting the fittings are purposely provided with.

Another characteristic of the clip lies in that the extensions at the top of the clip not only face each other but are moreover folded and extend towards the base, defining parallel contacting sectors, thereby effortlessly withstanding all the stresses transmitted from the base and sometimes allowing movement in relation to one another, without one part being locked to the other, when the clip is subject to extreme coaxial stresses with the bolt axis.

Another characteristic lies in that the collapsible wings at the sides of the clip are not only trapezoidal in shape with their shorter base facing the vertex or top, but moreover have a longitudinal indent that prevents the actual wings from sliding on the edge of the respective window, thereby ensuring that they are locked and very substantially enhancing their dislodgement strength.

A further characteristic lies in that the lower stretch of the side sectors defined on either side of said collapsible wings in first vertical and then becomes upwardly convergent, thereby enabling the actual clip to be guided and centered within the window, to ensure a relative positioning of the fitting fixed thereto when the latter is simple or unitary, since turning is thus prevented.

The clip moreover has a chamfer at the top that gives it a cone frustum shape, making it easier for the clip to face and enter the respective receiving window, i.e., making it easier for the actual clip to be mounted.

DESCRIPTION OF THE DRAWINGS

In order to provide a full description and contribute to the complete understanding of the characteristics of this invention, a set of drawings is attached to the specification which, while purely illustrative and not fully comprehensive, show the following.

DESCRIPTION OF THE EMBODIMENT OF THE INVENTION

With reference to the drawings it is clear that the roof comprises a roof liner (1) and a number of fittings, such as sun visors (2), handles (3), hangers (4) or passenger lights (5), preassembled on the roof liner (1) in such a way that metal clips (6) are provided on the side assembled to the bodywork. The clips (6) receive the lockscrews of the fittings, and, on the other hand define means for fixing the self-supporting roof liner on the bodywork. The attachment means of the roof liner to the bodywork of the vehicle also comprise plastic clips (7) that are known per se.

Figure 2A:
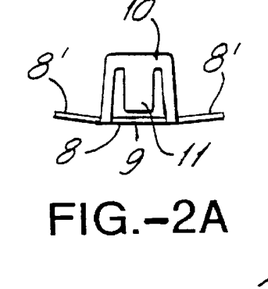
FIG. 2 is three views of the metal clip fixing the self-supporting roof liner.
Figure 2B:
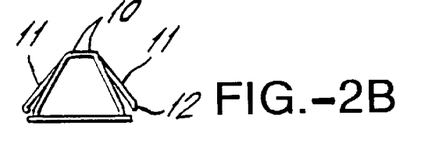
Figure 2C:
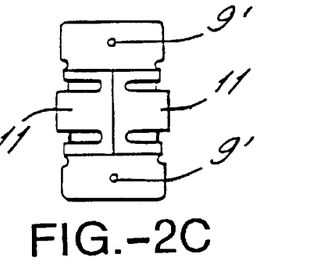
Figure 3:
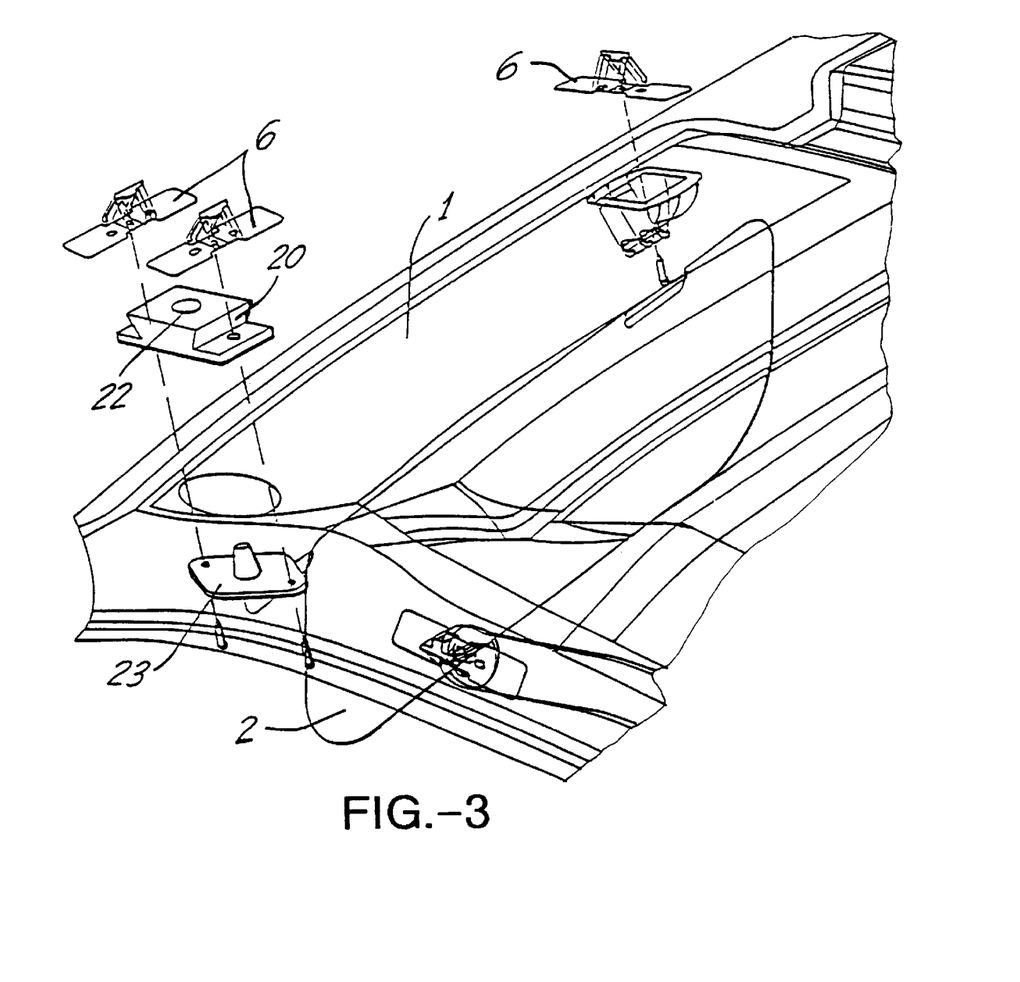
FIG. 3 is an enlarged perspective view of the various elements used for preassembling the sun visors to the roof liner, and the clips for fixing to the bodywork.

The anchoring metal clips (6) comprise a flat base (8) having a through hole (9), two extensions (8') and two inwardly folded projections (10) lying facing each other to form a wedge, with outwardly diverging wings (11) on their sides leading to a rounded edge (12). These wings (11) are highly resistant but are also flexible enough to retract when sufficient force is applied, to reach the flat of the wedge as such, and return to their original position after surpassing the edge of the receiving hole.

The transverse extensions (8') also increase and improve the surface supporting the clip (6) on the fitting. They can optionally be slightly arched to produce a spring effect capable of offsetting any gap or maladjustment that could result when tightening the lockscrews.

Now then, in order to mount the roof on the inside of a vehicle, once in the right position and with the various clips (6) facing the holes provided on the roof of the vehicle, pressure is exerted upon the clips (6) that move into the holes easily due to their wedge form, the wings (11) giving way on being pressed against the side walls of the receiving holes, and returning to their position after surpassing their mouth. The clips are thus held still within their holes and with them so is the self-supporting roof liner.

Figure 1:
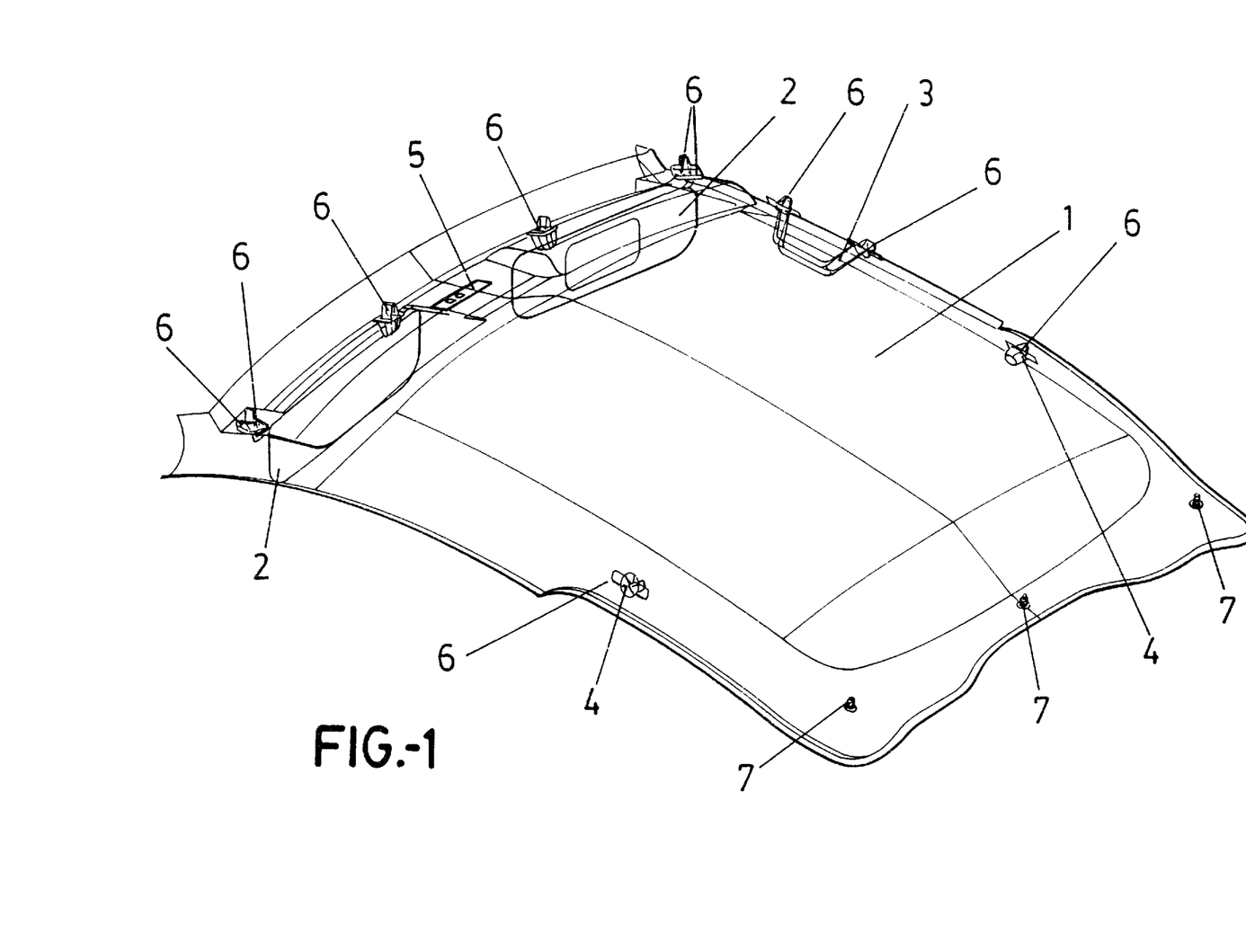
FIG. 1 is a perspective of the self-supporting roof liner with the preassembled fittings and plurality of clips arranged to mount the assembly on the inside of the vehicle bodywork.

As shown in FIG. 1, in addition to the points to anchor the roof liner (1) that match the positions of the various fittings, plastic clips (7) that are per se known are used to fix the rear end of the roof, and likewise inserted in their respective housings.

Figure 4:
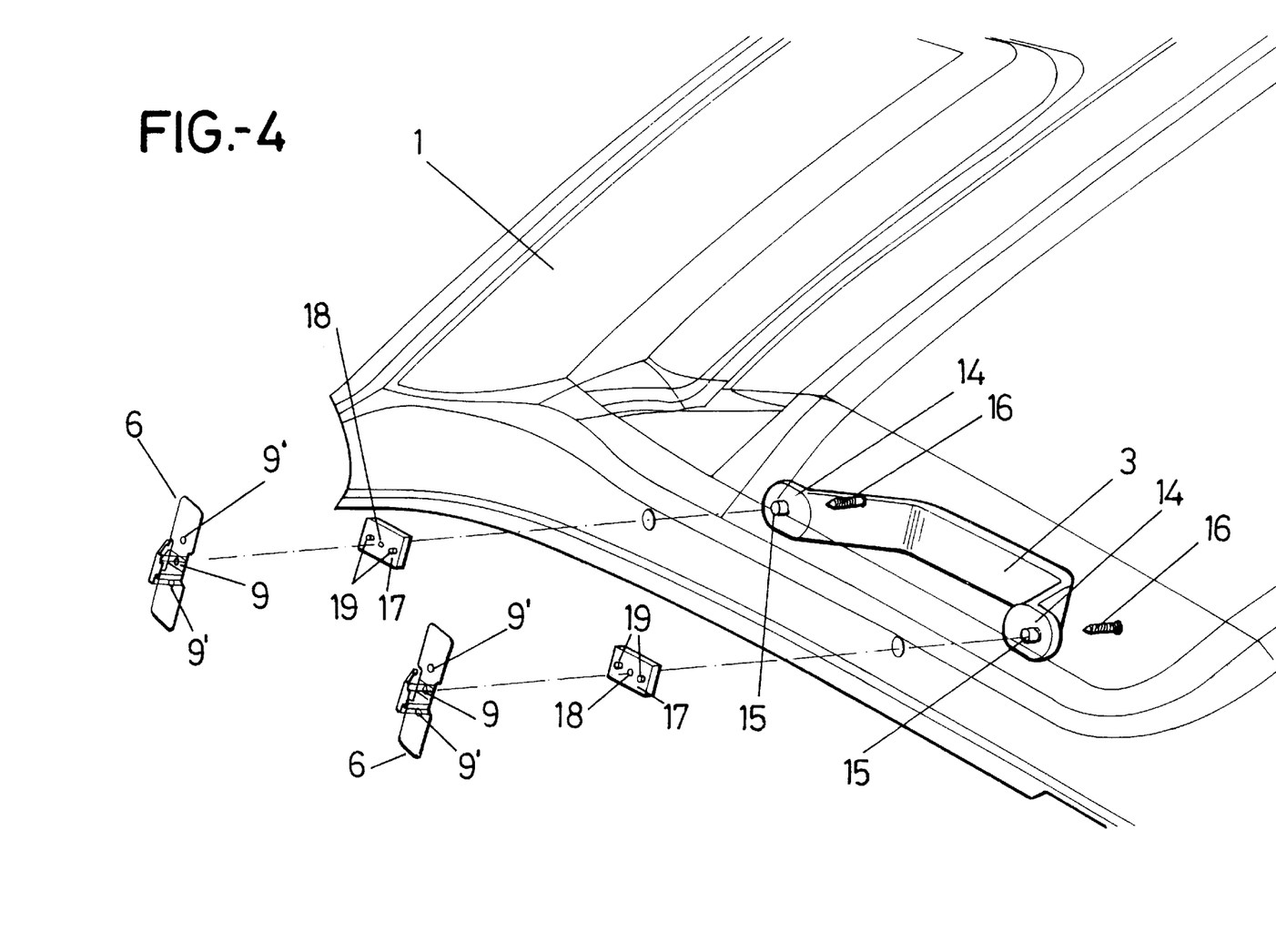
FIG. 4 is an enlarged perspective view of the various elements used for preassembling the handles to the roof liner, and the clips for fixing to the bodywork.
Figure 5:
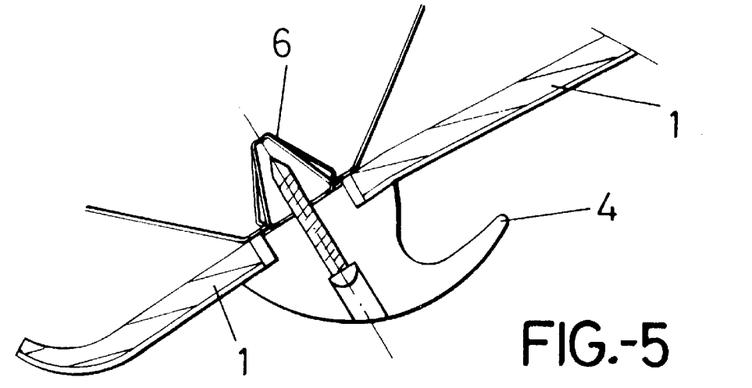
FIG. 5 shows detailed sections of the various elements used to couple the hangers.

Now then, before mounting the subject roof onto the vehicle bodywork, the parts making up the roof, viz. roof liner and fittings, must be preassembled to make up a compact unit that is then carried to the mounting chain. Thus, for instance, when preassembling the handles, as shown in FIG. 4, the side that is visible inside the vehicle is provided with a handle (3) that has studs (15) at its two attachment extensions (14) for the passage of bolts (16), which bolts cross the roof liner (1) and a separating part (17) through the holes (18) and are fixed to the metal clips (6) at their central holes (9), thereby for the unit comprising the handle (3), roof liner (1), separating part (17) and clip (6) to be linked to each other. In order to expedite the bolting operation described, the clips (6) have holes (9') at their extensions (8') to house studs (19) provided on the separating parts or on the fittings as such, that help centered and position the parts with respect to one another and, after mounting the roof liner on the bodywork, prevent the fittings from turning.

Figure 6:
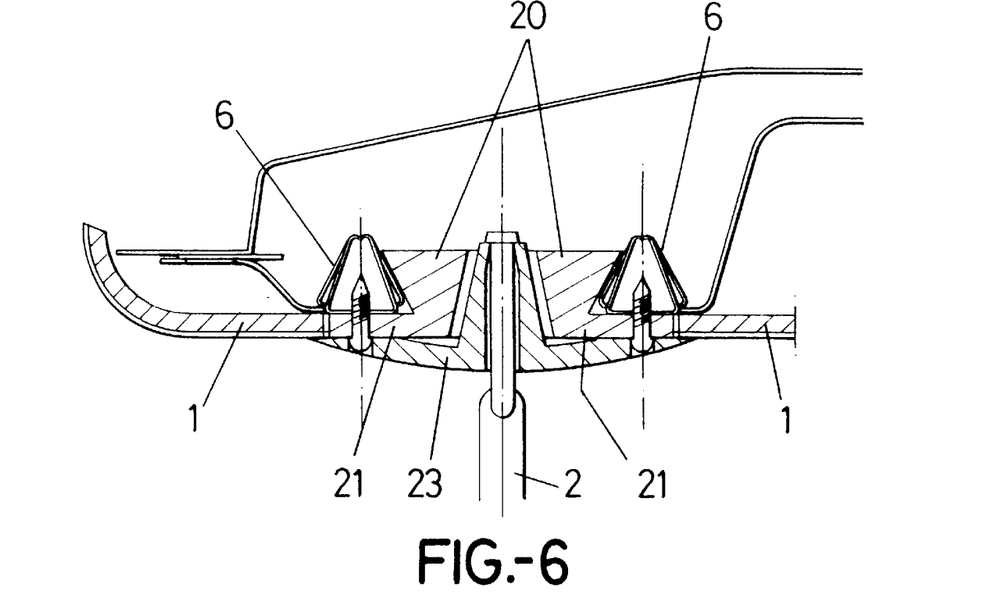
FIG. 6 is a detailed section view of the various elements used to fix the sun visors to the roof liner, at their turning axis, showing the special manner in which the separating part is used.
Figure 7:
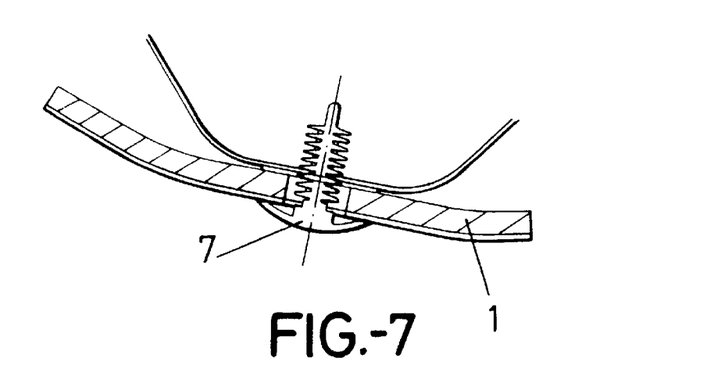
FIG. 7 is a detailed section of the conventional rear plastic clips.

As shown in the figures, the remaining fittings are similarly attached to the roof liner (1) using operatively designed separating parts and one or two metal clips (6), as required, forming a roof that is provided on one of its faces with all the required fittings, and clips (6) on the other to be fixed to the bodywork. In particular, as shown in FIG. 6, in order for the turning end of the sun visor (23) to be attached, a separating part (20) has been devised to be dovetail-shaped, clips (6) being coupled to its flat ends and moreover having a central hole (22) to locate the turning axis of the sun visor.

Figure 8A:
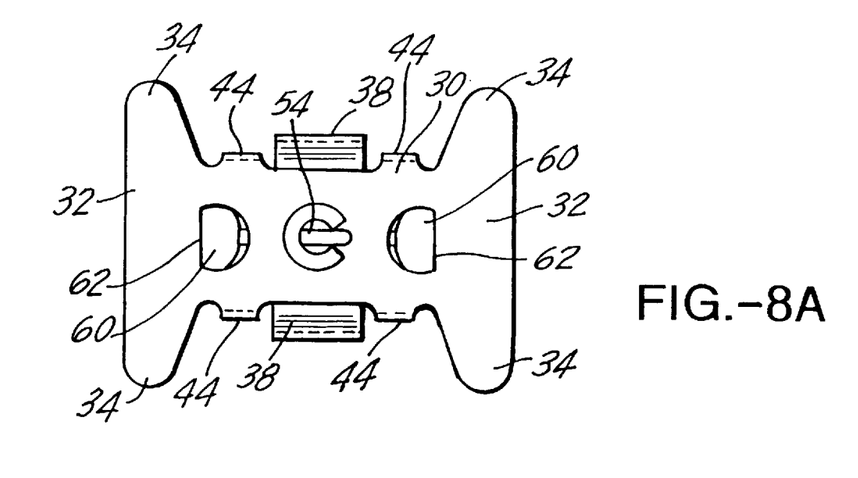
FIG. 8 is a plan and two side elevation views of the clip made in accordance with an alternative embodiment of the present invention.
Figure 8B:
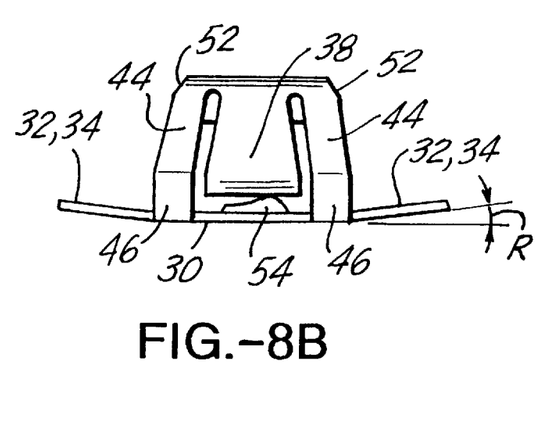
Figure 8C:
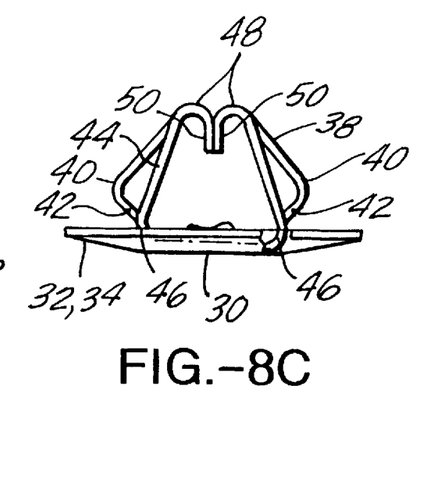
Figure 9A:
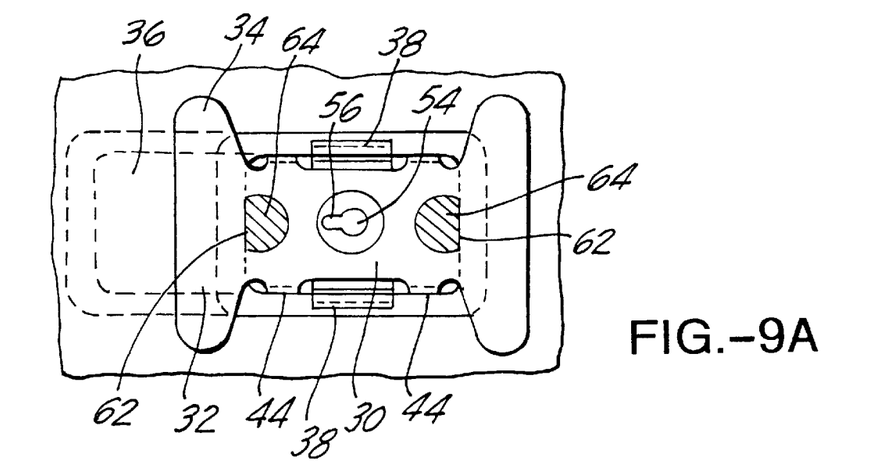
FIG. 9 shows the same three views of the preceding figure, with the clip mounted on a window of a vehicle bodywork roof and part of a fitting anchored with the assistance of the clip as such.
Figure 9B:
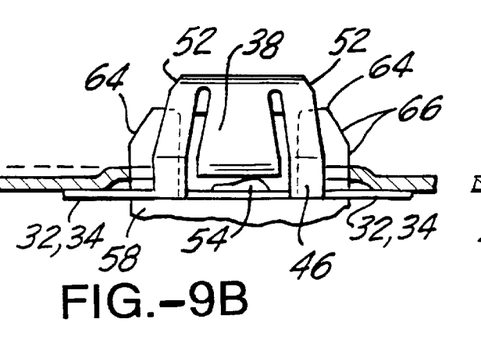
Figure 9C:
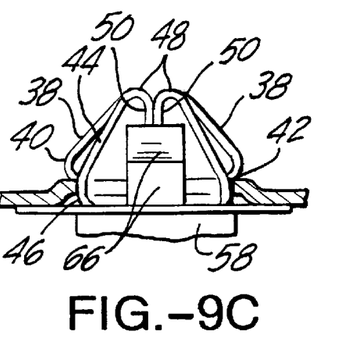

In regard to FIGS. 8 and 9, an alternative embodiment of the clips, used for fixing the fittings onto a vehicle roof is shown. These clips include a metallic part with a flat, rectangular base that is actually designated with reference, having end extensions (32) that have side extensions (34), the latter being designed in order that the clip as a whole may be full stably supported through such side extensions (34) even if the window (36) provided on the vehicle bodywork roof is longer than the least required.

The extensions (32) and their side extensions (34) are slightly upwardly inclined, lying at an angle a to the horizontal plane, as shown in the elevation view of FIG. 8, to foster the locking and fixing of the clip onto the respective window (36).

The clip has collapsible wings (38) on its side that are trapezoidal in shape, the shorter base lying at the top of the actual clip, whereas the bottom, after a rounded elbow (40), extends into an inwardly converging stretch provided with a longitudinal indent (42) designed to prevent the actual clip from sliding on the edge of the window (36), thereby ensuring that the clip is locked and very substantially increasing the dislodgment strength.

On either side of the collapsible wings (38), the sides of the actual clip define sectors (44) having a lower vertical stretch (46) and being otherwise inclined to the top (48), and thus both sides (44) converge towards said top, reaching what is deemed as the top (48) where they form round elbows and result in projections (50) that extend parallel to and in contact with each other towards the base.

The sides are further provided with end chamfers (52) at the top, their purpose being as described hereinafter.

The clip also includes a central hole (54) with a side or radial tear (56), the hole being conformed with a thread in order to allow the bolt to be screwed towards the side on which the fitting (58) is to be fixed onto the vehicle bodywork roof.

As for the side holes (60) on the actual flat base (30) of the clip, such are provided with a right-angled chamfer (62) that lies parallel and close to the respective outer edge, standing as a means through which the guides (64) for positioning the bases or supports of the fittings (58) that are to be fixed are inserted, with the assistance of the clip described, below the vehicle roof, such guides being provided with vertical, inclined planes (66).

In accordance with the above-described characteristics of the clip, the side extensions (34) stand as a means allowing the clip to be full stably supported, even if the anchoring window (36) should be longer than the least required.

For their part, the collapsible wings (38) provided on the sides of the clip foster, due to their trapezoidal configuration, the achievement of a better reaction balance on the area above said wings, allowing the chamfer (52) to be provided on the top corners which, together with the inclination of the actual wings (38) and the sectors (44), conform at the top a sort of pyramid frustum that makes facing and insertion into the respective window (36) easier.

As for the sectors (44) on the sides of the clip, the first vertical stretch (46) enables the actual clip to be guided and centered inside its window, thereby ensuring a relative positioning of the fitting (58) fixed thereto, when the latter is simple or unitary, for it is thus prevented from turning.

For its part, the longitudinal indent (42) provided on the actual wings (38) prevents the same from sliding on the edge of the window (36), ensuring that they are locked and substantially enhancing the dislodgment strength.

As for the particular configuration of the side holes (60), the side chamfer (62) allows a correct insertion of the guides (64) at the base or support of the fittings (58), and is in turn useful to make the clip easier to insert into and then center on the window, when the clip slides along the vertical, inclined planes (66) with which said guides (64) are provided.

Finally, as for the projections (50) folded at the top into the sides or sectors (44) of the clip, since they lie parallel and in contact with each other, and project toward the base, they allow all the stresses transmitted from the base to be withstood, and are concurrently able to move with respect to one another without one part being locked to the other, when the clip is subject to non-coaxial extreme stresses with the bolt axis.

I claim:

1. A self-supporting roof for a vehicle, comprising a self-supporting roof liner provided with built-in fittings directly mountable upon the vehicle roof, said roof liner carrying preassembled fittings (2), (3), (4), clips (6) each receiving one of a plurality of bolts for linking said fittings in a central hole (9) thereof, said clips (6) fixing the roof liner preassembled with said fittings to the inside of a bodywork of the vehicle, by snapping said clips (6) into receiving holes provided in the bodywork, each of send clips having side wings (11) so that a joint formed by said clip with said bodywork and roof liner is stiffened by the clip-in effect of said side wings (11) against an inner edge of the receiving holes, each of said clips include a flat base (8) and extensions (8') arching from the base.

2. A self-supporting roof as in claim 1, which further includes separating elements (17) disposed between the clips (6) and the fittings (2), (3), (4), each said clip further having inwardly folded symmetrical projections (10) emerging centrally from said base to define a wedge, said side wings (11) diverging from side faces of the clip with rounded ends, so that said side wings (11) give way slightly, collapsing, when a wedged point of the clip (6) is inserted in one of the receiving holes of the vehicle bodywork, returning to their original position after surpassing the edge of the hole, against which a clip-like attachment takes place.

3. A self-supporting roof as in claim 2, wherein the projections (10) are folded at their free ends, their heads facing each other to form a flat surface.

4. A self supporting roof for a vehicle comprising:
a self-supporting roof liner provided with built-in fittings directly mountable upon the vehicle roof, said roof liner carrying preassembled fittings (2), (3) and (4), clips (6) each receiving one of a plurality of bolts for linking said fittings in a central hole (9) thereof, said clips (6) fixing the roof liner preassembled with said fittings to the inside of a bodywork of the vehicle, by snapping said clips (6) into receiving holes provided in the bodywork, each clip having side wings (11) so that a joint formed by said clip with said bodywork and roof liner is stiffened by the clip-in effect of said side wings (11) against an inner edge of the receiving holes;

wherein each said clip is a hard flexible steel clip (6) having a flat base (8) and supporting extensions (8') for positioning with respect to either separating elements (17) or directly upon coupling planes of the fittings, each said clip further having inwardly folded symmetrical projections (10) emerging centrally from said base to define a wedge, said side wings (11) diverging from side faces of the clip with rounded ends, so that said side wings (11) give way slightly, collapsing, when a wedged point of the clip (6) is inserted in one of the receiving holes of the vehicle bodywork, returning to their original position after surpassing the edge of the hole, against which a clip-like attachment taxes plane; and wherein in order for certain fittings to be fixed on the roof liner (1), said separating elements (17) are placed between the clips (6) and said packing roof liner (1) held by bolts to the fittings, said bolts each extending through a central hole (18) provided in each of said separating elements having studs (19) provided for centering and coupling to the holes (9') located in the extensions (8') of the clip (6), each separating element being flat-shaped for handles (3) and sun visors (2).

5. A self supporting roof, as in claim 4, wherein said support extensions (8') are arched.

6. A self-supporting roof for a vehicle, comprising a self-supporting roof liner provided with built-in fittings directly mountable upon the vehicle roof, said roof liner carrying preassembled fittings (2), (3), (4), clips (6) each receiving one of a plurality of bolts for linking said fittings in a central hole (9) thereof, said clips (6) fixing the roof liner preassembled with said fittings to the inside of a bodywork of the vehicle, by snapping said clips (6) into receiving holes provided in the bodywork, each clip having side wings (11) so that a joint formed by said clip with said bodywork and roof liner is stiffened by the clip-in effect of said side wings (11) against an inner edge of the receiving holes, wherein each said clip includes a rectangular metallic part having a flat base, side, collapsible wings leading on either of their sides into upwardly converging sectors defining a wedge shape for the actual clip, wherein the ends of the flat base of the clip have extensions with said extensions providing the clip with maximum support and stability on the respective anchoring window even if the window is longer than the least required.

7. The self supporting roof as in claim 6, wherein said side wings are trapezoidal and have a longitudinal indent with which locking at the respective edges of the window is ensured.

8. The self supporting roof as in claim 6, wherein both said vehicle side wings and side sectors are upwardly convergent, and are provided at the top with a chamfer that results in a cone frustum configuration that makes the actual clip easier to mount on the respective window.

9. The self supporting roof as in claim 6, wherein said sectors defined on either side of the side wings have a first vertical stretch that enables the clip to be guided and centered on the actual window.

10. The self supporting roof as in claim 6, wherein said side holes lying in the flat, central sector of the clip are provided with a chamfer that defines an outer, right-angled stretch that enables the insertion of the respective guides for positioning the supports of the fittings to be fixed.

* * * * *